United States Patent [19]

Martin et al.

[11] Patent Number: 4,661,411
[45] Date of Patent: Apr. 28, 1987

[54] METHOD FOR DEPOSITING A FLUOROCARBONSULFONIC ACID POLYMER ON A SUPPORT FROM A SOLUTION

[75] Inventors: Charles W. Martin; Bobby R. Ezzell; John D. Weaver, all of Lake Jackson, Tex.

[73] Assignee: The Dow Chemical Company, Midland, Mich.

[21] Appl. No.: 832,627

[22] Filed: Feb. 25, 1986

[51] Int. Cl.[4] .................... B32B 27/00; B05D 3/02; B05D 7/22
[52] U.S. Cl. ........................ 428/421; 427/385.5; 427/388.1; 427/389.7; 427/393.6; 427/430.1; 427/435; 427/443.2; 502/4; 502/109
[58] Field of Search ............... 502/402, 109, 4, 8, 502/439; 427/230, 232, 385.5, 393.6, 389.7, 388.1, 435, 430.1, 443.2; 428/421

[56] References Cited

U.S. PATENT DOCUMENTS

| | | | |
|---|---|---|---|
| 3,385,736 | 5/1968 | Deibert | 502/4 |
| 4,065,512 | 12/1977 | Cares | 502/4 X |
| 4,272,405 | 6/1981 | Wristers et al. | 502/109 |
| 4,329,435 | 5/1982 | Kimoto et al. | 521/38 |
| 4,330,654 | 5/1982 | Ezzell et al. | 526/243 |
| 4,332,698 | 6/1982 | Bernstein et al. | 502/4 |
| 4,358,545 | 11/1982 | Ezzell et al. | 521/27 |
| 4,528,281 | 7/1985 | Sutt, Jr. | 502/402 |

FOREIGN PATENT DOCUMENTS 53-037793  4/1978  Japan .................................. 502/4

*Primary Examiner*—Thurman K. Page

[57] ABSTRACT

This invention discloses improved heterogeneous acid catalysts and a method for preparing these catalysts. A heterogeneous acid catalyst has been prepared by treating a carrier material with a solution containing a fluorocarbonsulfonic acid polymer dissolved in a suitable solvent, removing the solvent, and heat treating the coated carrier in such a way so as to prevent the polymer from being leached off the carrier. The final heat treatment of the composition to prevent the polymer from redissolving comprises an improvement in the preparation of a heterogeneous catalyst.

14 Claims, No Drawings

METHOD FOR DEPOSITING A FLUOROCARBONSULFONIC ACID POLYMER ON A SUPPORT FROM A SOLUTION

BACKGROUND OF THE DISCLOSURE

The polymers of interest to this invention are substantially fluorinated and have pendant chains containing sulfonic acid groups or derivatives of sulfonic acid groups. The sulfonic acid groups exhibit extraordinarily high acid strength compared to sulfonic acids that are not fluorinated. Therefore, these materials are very useful as acid catalysts and have been shown to be effective in catalyzing many different reactions, such as: hydration of olefins and epoxides, dehydration of alcohols, alkylation and acylation of aromatic hydrocarbons, isomerization and alkylation of paraffins, nitration of organics, pinacolone rearrangements, esterification of carboxylic acids, hydrolysis of carboxylic acid derivatives, and Diels-Alder condensations.

Fluorocarbon polymers with sulfonic acid pendant groups have advantages over other types of acid catalysts in that the fluorocarbon portion gives extraordinary chemical and thermal stability, as well as almost complete insolubility in most systems. Therefore, the polymer can be used as a heterogeneous catalyst and can be recovered very easily and reused. Since the reaction occurs on or near the catalyst surface, the amount of surface area must be maximized to obtain optimum efficiency, defined as activity per unit weight of catalyst. This is especially important when considering fluorocarbon polymers because of their relatively high cost. One factor that has prevented wide-spread use of these materials as catalysts is their high cost. Their manufacture requires more specialized technology and a larger capital investment than for conventional ion exchange catalysts. It is for this reason that the catalytic efficiency of such a product must be maximized. As noted above, the catalytic efficiency is defined as the amount of product produced divided by the amount of catalyst used. One technique of increasing the efficiency of a heterogeneous catalyst is to increase its surface area, thereby exposing more reactive surface while involving less unused catalyst below the surface. The process of this invention of applying a thin coat of polymer catalyst to a carrier increases the ratio of active surface area to weight of polymer, compared to that for an unsupported polymer catalyst.

In the prior art, increasing the surface area of a fluorocarbon polymer has been accomplished by several methods, all of which have inherent disadvantages. By decreasing the particle size of a solid, the surface area is increased. However, the disadvantages of using a fine particulate catalyst include poor flow dynamics, plugging problems, loss of catalyst include poor flow dynamics, plugging problems, loss of catalyst by entrainment, and more difficult catalyst recovery.

As an example of one prior art enhancement, the fluorocarbon can be extruded into tubing while it is in the thermoplastic sulfonyl fluoride ($SO_2F$) form, then converted to the sulfonic acid. Extrusion into tubing requires expensive, specialized equipment and careful handling of the fragile material during processing and reactor assembly. Furthermore, the mechanical strength of the polymer is such that tubing with a wall thickness less than about 0.005 inches (0.125 mm) becomes impractical. This results in only a modest surface area to weight ratio.

The polymer is the thermoplastic sulfonyl fluoride form can be melt deposited onto a solid substrate, and then the surface layer can be converted to the sulfonic acid. This process also requires specialized equipment to form the catalyst to the desired shape of the substrate. Only the portion of the polymer on the surface is used in the catalytic process since the subsurface portion must remain in the $SO_2F$ form to remain bonded to the substrate. This is an inefficient use of the expensive polymer because the surface area is small compared to the amount of polymer below the surface.

Although it is considered substantially insoluble, dilute solutions of the fluorocarbon polymer in the sulfonic acid form can be prepared. These solutions can then be used to coat supports to make catalyst pellets, for instance. But the process of dissolving the polymer converts it from a substantially insoluble species to a species that is very soluble in many polar solvents. Thus, supported catalysts prepared by this method in the prior art have only limited utility because the polymer redissolves very easily in many solvents.

One aspect of the present invention is the surprising discovery that a polymer having sulfonic acid groups can be deposited onto a support from a solution, as described above, and then annealed at an elevated temperature, thereby rendering the polymer insoluble. This annealing step unexpectedly reduces polymer leach during a reaction, thereby resulting in a more durable and long lasting catalyst. By supporting the polymer on a carrier, the surface area of the catalyst is increased, and this in turn improves the catalytic efficiency and lowers the cost of the catalyst.

DETAILED DESCRIPTION OF THE INVENTION

This invention discloses improved heterogeneous acid catalysts and a novel, unobvious method of preparing these catalysts. The method of preparation involves treating a carrier material with a solution, which contains a fluorinated polymer dissolved in a suitable solvent, such polymer having sulfonic acid functional groups; removing the solvent involved in the prior step; and heat treating or annealing the coated carrier in a fashion to prevent the polymer from being leached from the carrier. The final heat treatment, or annealing, of the composition comprises the improvement in the preparation of a heterogeneous catalyst in that the step increases the resistance of the polymer to being leached from the carrier surface and it results in a more durable, and therefore more efficient acid catalyst. In addition, other polymer coated articles, such as ion specific electrodes, prepared by the techniques described herein also would be greatly improved.

The polymers that are applicable to this invention have structures that include a substantially fluorinated carbon chain that has attached to it side chains that are also substantially fluorinated and contain sulfonic acid groups or derivatives of sulfonic acid groups. There may be other side chains present that do not contain sulfonic acid groups, if desired, such as fluorinated alkyl or ether chains with no other functional group attached to them. There also may be atoms present in these chains other than carbon and fluorine, such as oxygen, chlorine, and bromine. Examples of these polymers are those described in U.S. Pat. Nos. 3,282,875; 4,329,435; 4,330,654 and 4,358,545. The fluorocarbon portion of the polymer molecule contributes such desirable properties as high thermal and chemical stability and low solubility. The sulfonic acid groups exhibit extraordinarily high acid strength compared to sulfonic acids that are not fluorinated. Therefore, these materials are very useful as strong acid catalysts and they have been shown to be effective in catalyzing many different types of reactions.

Typical polymers that may be used in this invention have the general structure described below:

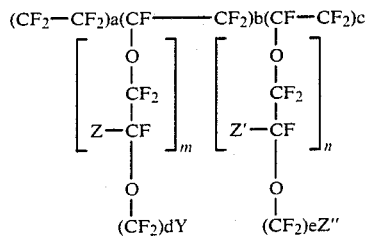

where:
Y is $SO_3H$, or any group easily converted to $SO_3H$;
Z, Z', and Z'' are independently F, Cl, Br, $CF_3$, $CF_2Cl$, or fluorinated alkyl;
the ratio of a/b varies from about 2 to about 50;
c is 0 or greater than 0;
m and n are independently 0 to 4; and
d and e are 2 to 5.

In the identified variables, the value of a variable at one location in the formula does not limit the value at another location in the formula. At the various occurrences of the m, n, d or e, the values can be equal or different. The same is true of the radical Z at the various locations. In that sense, the values are said to be "independent".

Since reactions involving heterogeneous catalysts occur on or near the surface of the catalyst, the surface area must be examined to get maximum catalytic efficiency. Several attempts at this have been made in the prior art, but each attempt results in inherent disadvantages. In this invention, novel and unobvious processes are disclosed for supporting a sulfonyl functional fluorinated polymer on a support, thereby creating a catalyst with more active surface area and improved durability.

The polymer is usually produced in the sulfonyl fluoride form, which is thermoplastic and can be melt fabricated by conventional techniques, such as extrusion or pressing. After it is hydrolyzed to the acid form, the polymer is not nearly as thermoplastic as it was originally, and it is therefore difficult to fabricate into useful shapes and forms. It cannot be melt extruded, although some softening occurs above 150° C. However, it is possible to dissolve the polymer by heating it with an aqueous alcohol, particularly 50% aqueous ethanol, to about 250° C. or higher for several hours in a high pressure autoclave. This converts the polymer from a species that is substantially insoluble to a species that is very soluble in many polar solvents. The resulting mixture may not be a true solution, but instead may be a dispersion of finely divided particles. In this invention, "polymer solution" is also understood to encompass dispersions. These solutions can be filtered through a 0.2 micrometer filter. Other solvents and mixtures may also be effective in dissolving the polymer.

In this invention, the polymer is deposited on the carrier by soaking the carrier in the polymer solution and then removing the solvent. Ordinarily, if this composition is treated again with a polar solvent, even at ambient temperature, the polymer redissolves very quickly. Thus, such a composition is not useful as a heterogeneous catalyst in many applications. However, heating the composition to a sufficient temperature for a sufficient time renders the polymer insoluble and prevents it from redissolving. Such a composition is much more useful as an acid catalyst due to its improved durability. This process can be reversed by repeating the high temperature dissolution in 50% ethanol in order to recover the polymer from the carrier.

Reducing the solubility by heating the polymer can be referred to as an annealing process. Annealing probably can occur at any temperature above the glass transition temperature of the polymer, which occurs around 20° C. to 50° C. for most fluorocarbons of interest here. But the viscosity of the polymer is very high, especially below about 150° C., and the time required for the polymer to anneal is prohibitively long as low temperature. Also, the stability of most typical polymers decreases markedly above about 300° C. These practicalities define lower and upper limits on the process step. Therefore, the annealing temperature preferably is above 100° C., more preferably between 150° C. and 300° C., and most preferably between 200° C. and 225° C. At 225° C., annealing is essentially complete within one hour.

The composition of the carrier is not critical, and the properties that are considered desirable for a carrier may vary in different applications. Properties that may be important in some situations include high surface area, high crush strength, high porosity, chemical resistance, thermal stability, and lost cost. In all cases, the carrier must be resistant to the sulfonic acid polymer solution and to the high temperature reached during the annealing procedure. Some representative materials that could serve as carriers include alumina, silica, zeolites, silicon carbide, silica-alumina, porous glass, ceramic, spinel, clay and carbon. The preferred weight ratio of polymer to support is between 0.001 and 0.50. There may be instances in which the compositions prepared by the process of this invention may be used for applications other than acid catalysis. In these instances, the inert carriers may be of some form or material other than those described above.

The following examples are illustrative of certain specific embodiments of this invention.

EXAMPLE 1

This procedure describes the preparation of a solution containing a fluorinated polymer having sulfonic acid functional groups. The polymer used in Examples 1–5 has the structure:

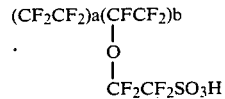

where the ratio a/b is such that the equivalent weight of the polymer is about 930 gm/equivalent.

A glass-lined stirred autoclave was charged with 150 ml of 95% ethanol, 150 ml of water, and 15 gm of the fluorinated polymer. The autoclave was sealed and heated to 250° C. with vigorous stirring for three hours. It was then cooled to room temperature and vented. Afterwards, the autoclave contained a light brown, slightly turbid liquid. The contents were filtered through a coarse filter (40-60 micrometers) and again through a fine filter (4-5.5 micrometers) to obtain a clear, slightly colored solution. By titration with 0.01N NaOH, the acid capacity of the solution was determined to be 0.0740 milliequivalents/gm. This corresponds to approximately 6.9 weight percent polymer in the solution.

EXAMPLE 2

This example discloses the process of annealing a polymer to reduce or eliminate the solubility of the polymer. The solvent was evaporated from approximately 10 gm of a solution of polymer prepared as described in Example 1, leaving a brown solid residue. Upon addition of 5 ml of ethanol, the residue redissolved very readily without heating or agitation. The solvent was again removed and the flask containing the residue was heated to 155°-165° C. for about three days. After cooling, ethanol was added to the residue. There was no apparent dissolution of the residue. This vividly demonstrates the change in solubility of the polymer induced by the heat treatment, or annealing.

EXAMPLE 3

In this example, the effect of annealing a coated catalyst is demonstrated. An alumina catalyst support was dried and then soaked for 20 minutes in the polymer solution of Example 1. The excess liquid was decanted and the coated support was dried under vacuum for one hour at about 50°-75° C. The acid capacity was determined by titrating a portion of the coated product with standard NaOH. A second portion was washed in boiling ethanol for 30 minutes, dried at 100° C. under vacuum for two hours and then titrated. A third portion was baked at 100° C. for 24 hours prior to undergoing the same treatment as the second portion. A fourth portion was baked at 200° C. for one hour prior to undergoing the same wash and dry treatment. The results of these procedures, described in Table I, show that one effect of annealing the supported polymer catalyst is reduced solubility of the polymer. Without annealing, hot ethanol leached all of the polymer from the support.

TABLE I

| Portion | Annealing | Solvent | Acid Capacity meq/gm | Polymer Coat |
|---|---|---|---|---|
| 1 | None | None | 0.0271 | 2.03 wt % |
| 2 | None | Hot ethanol | 0.0 | 0.0 |
| 3 | 100°, 24hr | Hot ethanol | 0.0102 | 0.94 |
| 4 | 200°, 1 hr | Hot ethanol | 0.0189 | 1.77 |

EXAMPLE 4

The effect of annealing a coated catalyst support for extended periods of time at 175° C. is demonstrated in this example. A solution containing 9.4 wt% polymer in 50% ethanol was prepared as in Example 1. An alumina catalyst support was soaked in this solution and the solvent was removed under vacuum. In each of three runs, the coated support was heated to 175° C. for the time indicated in Table II and then was divided into two portions. One portion was titrated while the other portion was washed with boiling ethanol for 30 minutes, dried at 100° C. under vacuum for two hours, and titrated. The results described in Table II show the positive effect of longer annealing time at 175° C. on polymer leach.

TABLE II

| Run | Anneal Time | Before Ethanol Wash | | After Ethanol Wash | |
|---|---|---|---|---|---|
| | | Acid Capacity | Polymer Coating | Acid Capacity | Polymer Coating |
| 1 | 24 hrs | 0.0577 meq/gm | 5.36 wt % | 0.0279 meq/gm | 2.60 wt % |
| 2 | 48 hrs | 0.0557 | 5.17 | 0.0348 | 3.23 |
| 3 | 72 hrs | 0.0526 | 4.89 | 0.0495 | 4.60 |

EXAMPLE 5

A support with a polymer coating is used as an acid catalyst in this example. A catalyst composition with a polymer coat of 2.42 wt% (acid capacity 0.0260 meq/gm) was prepared as in Example 3 and annealed at 250° C. for one hour. It was loaded into three reactor tubes and heated to 150° C. Diethylene glycol was pumped into the first of the reactors. 1,4-Dioxane was identified in the effluent of the first reactor. A solution of diphenyl ether and dodecene was fed into the second of the reactors. The major product of this second reactor was dodecylphenyl phenyl ether. Propylene and water were fed to the third reactor. 2-Propanol was collected in the effluent of the third reactor. These varied uses confirm the utility of the novel catalyst of this invention.

While the foregoing is directed to the preferred embodiments of the present invention, other and further embodiments of the invention may be devised without departing from the basic scope thereof, and the scope thereof is determined by the claims which follow.

What is claimed is:
1. The method of supporting a fluorinated polymer having pendant chains containing sulfonic acid groups, on a support, comprising the steps:
    (a) soaking a substrate with a solution that contains a fluorinated polymer having pendant chains containing sulfonic acid groups;
    (b) removing the solvent from the mixture;
    (c) heating the remaining composition to above the glass transition temperature of the polymer for a sufficient time to render the polymer insoluble.
2. The method of claim 1 wherein the temperature is above 100° C.
3. The method of claim 1 wherein the temperature is between 150° C. and 300° C.
4. The method of claim 1 wherein the temperature is between 200° C. and 225° C.
5. The method of claim 1 wherein the temperature is about 225° C.
6. The method of claim 1 wherein the solution that is used to soak the support contains a fluorinated polymer having pendant chains with the structure:

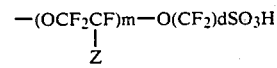

where
Z is F, Cl, Br, $CF_3$, $CF_2Cl$, or fluorinated alkyl;
m is 0 to 4;
d is 2 to 5.
7. The method of claim 6 wherein m is 0 and d is 2.
8. The method of claim 1 wherein the solvent is an alcohol or a mixture of an alcohol and water 9. The method of claim 8 wherein the alcohol is ethanol.

10. The method of claim 1 wherein the dissolved polymer passes through a 0.2 micrometer filter.

11. The method of claim 1 wherein the support is resistant to the sulfonic acid polymer solution and to the temperature to which it is heated.

12. The method of claim 11 wherein the support is alumina, silica, zeolites, silicon carbide, silica-alumina, porous glass, ceramic, spinel, clay, or carbon.

13. The product prepared by the method of claim 1.

14. The process of using the product prepared by the method of claim 1 as an acid catalyst.

* * * * *